July 24, 1934.　　　C. G. HALL　　　1,967,933
AUTOMATIC BAKING MACHINE
Filed June 17, 1932　　4 Sheets-Sheet 1
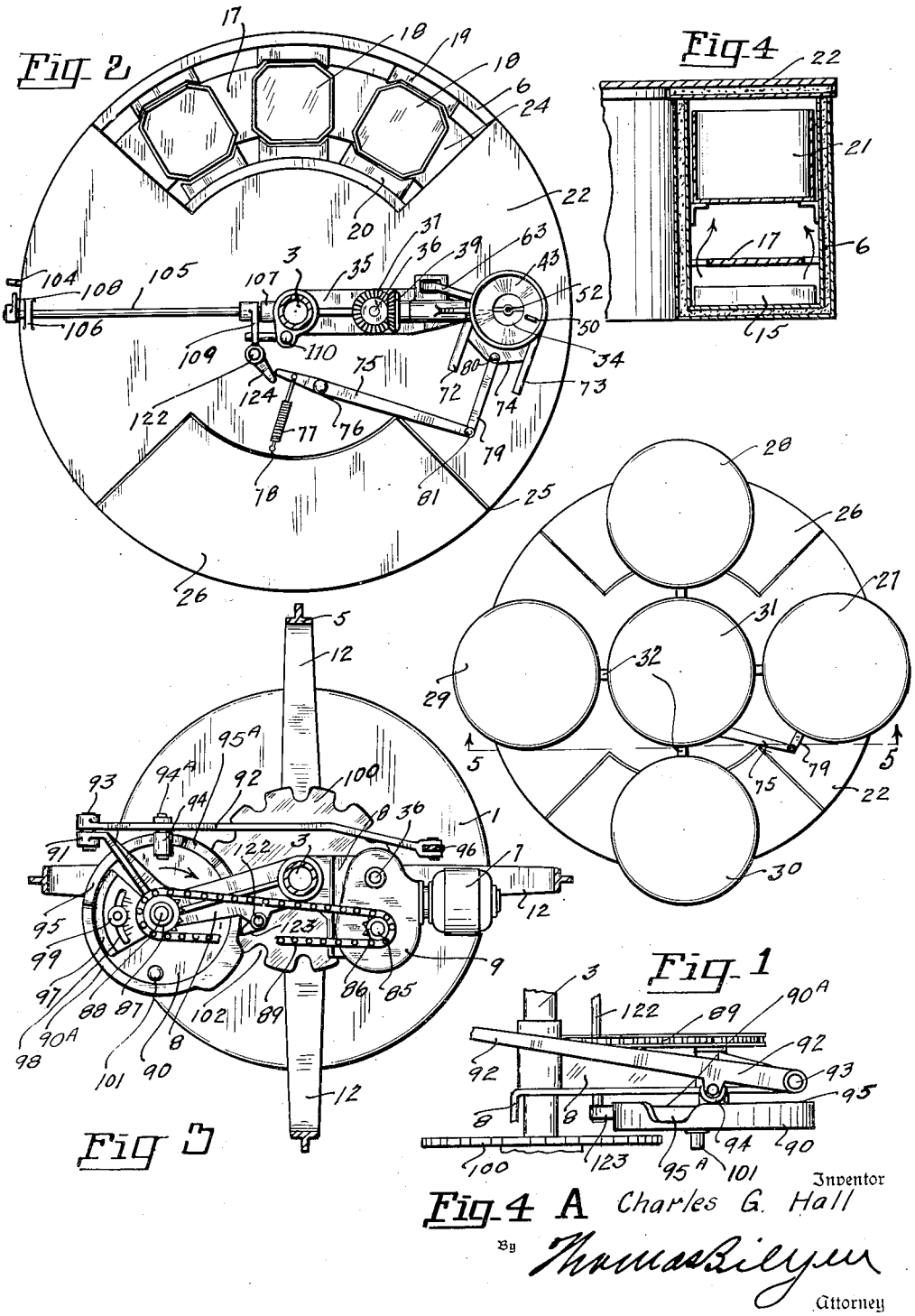
Inventor
Charles G. Hall
By Thomas Billyou
Attorney

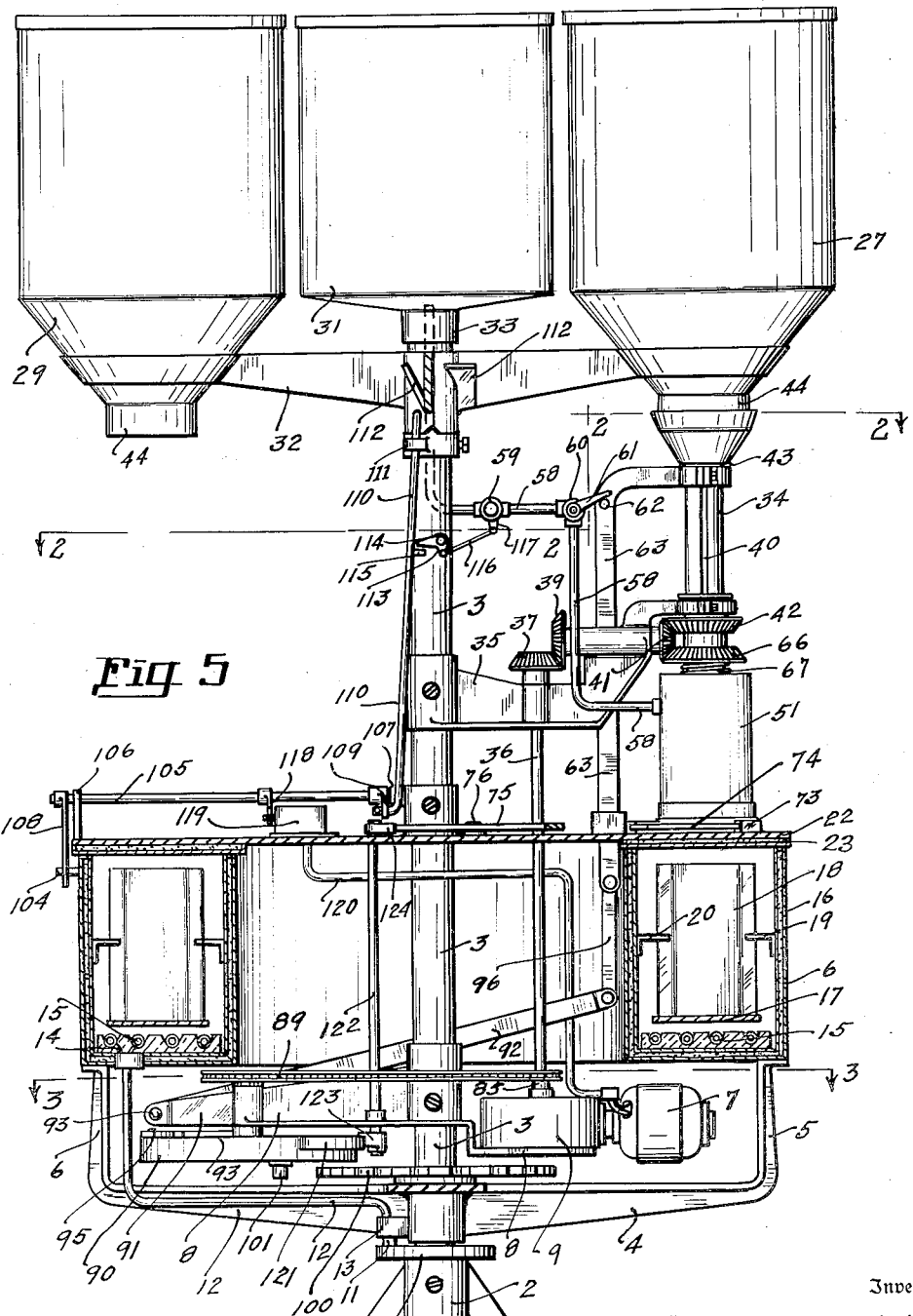

July 24, 1934.　　　　C. G. HALL　　　　1,967,933
AUTOMATIC BAKING MACHINE
Filed June 17, 1932　　　4 Sheets-Sheet 3
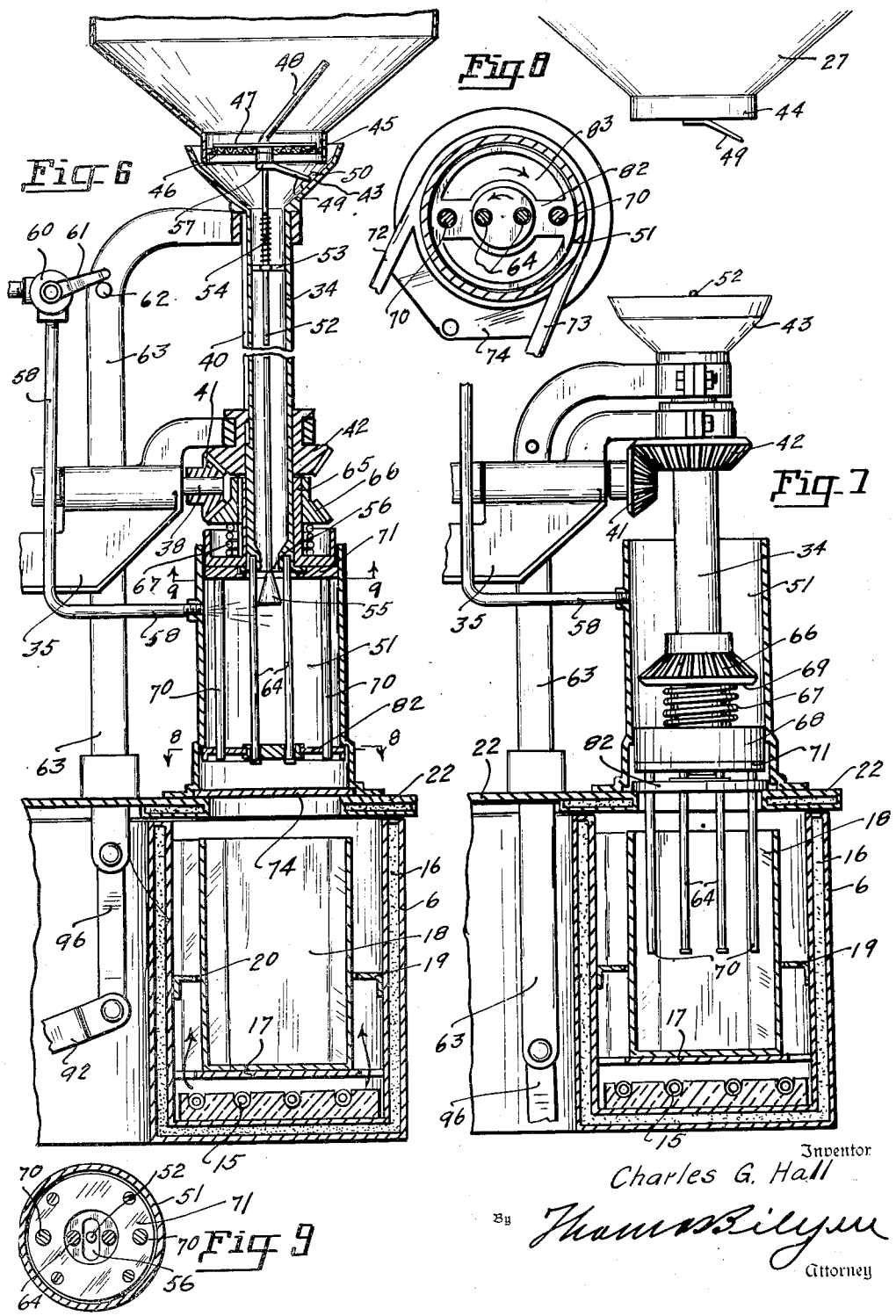

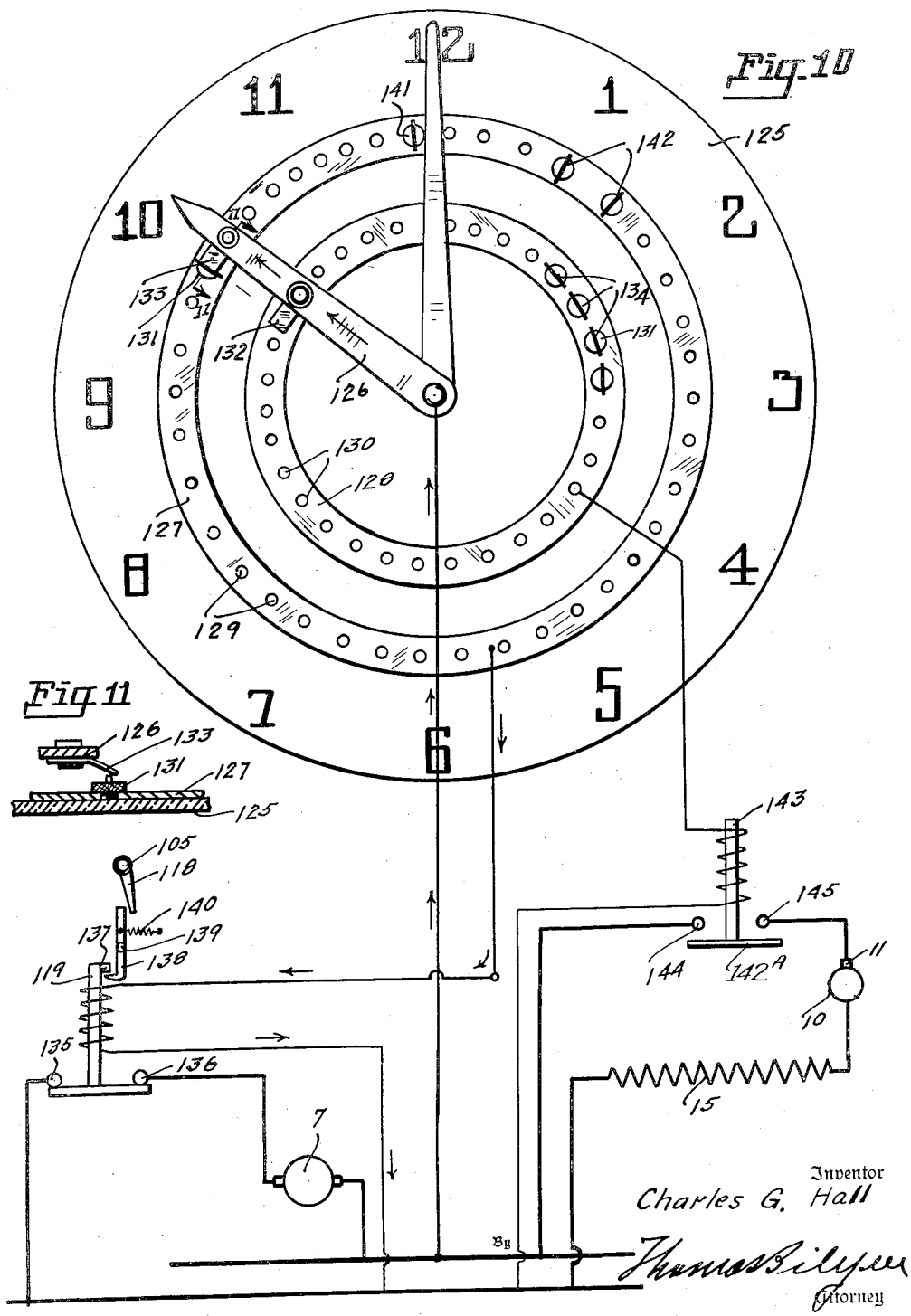

Patented July 24, 1934

1,967,933

UNITED STATES PATENT OFFICE 1,967,933

AUTOMATIC BAKING MACHINE

Charles G. Hall, Caldwell, Idaho

Application June 17, 1932, Serial No. 617,695

17 Claims. (Cl. 107—4)

My invention relates to automatic baking machines that are primarily intended for the automatic baking of bread and cake.

My invention is particularly adapted for the automatic producing of bread and cake in nominal quantities and in continuous production, as in the home, in eating places, and in the grocery store and the like, where bread and cake may be made automatically. The only attendant required being the one to start the operation and to remove the baked product from the oven.

One of the objects of my invention is to provide a device that will automatically produce bakery goods as a continuous operation.

The invention is primarily comprised of a plurality of hoppers adapted for holding and for having dispensed therefrom the essentials for the making of the product to be baked. These containers are superposed the receptacles into which the product to be baked is placed. The product is mixed in advance and after the same is disposed in the baking receptacles and before the baking operation.

An automatic dispensing and mixing head is provided that is adapted for being placed above the baking receptacles for dispensing the materials within the baking receptacle and for mixing the products within the baking receptacle after having been automatically dispensed therein.

Means are provided for raising the dispensing and mixing head and for progressing the same to the next baking receptacle.

A timing head is also provided that operates in conjunction with a time meter in order that the operation may be carried on as a continuous operation and in which time lapses are automatically provided for.

The mixing and agitating may be carried on independent of the dispensing.

An electric prime mover is provided and electric energy is conducted thereto through suitable electric conductors.

Manually settable means are provided for starting the cycle of operation and manually settable means are provided for stopping the cycle of operation at any predetermined point.

A further object of my invention is to provide an automatic baking machine that may be used for the making of the maximum number of baked units in a single operation, or a lesser number, as desired.

A still further object of my invention consists in providing an automatic machine that will automatically produce the number of baked units required in a single cycle of operation, which number may be the maximum, or any number of units less than the maximum.

A still further object of my invention consists in providing an automatic baking machine that is adapted for automatically agitating the theretofore mixed units batches at predetermined time intervals with means provided for settably predetermining the time interval of agitation and the length of the period of agitation.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a top, plan view, of the assembled device.

Fig. 2 is a sectional, plan view, of the assembled device. This view is taken on line 2—2 of Fig. 5, looking in the direction indicated.

Fig. 3 is a sectional, plan view, of the assembled device. This view is taken on line 3—3 of Fig. 5, looking in the direction indicated. This view is particularly made to illustrate the prime mover, the associated elements directly operable thereby, the star wheel and the cam assembly and the speed reducer associated with the prime mover.

Fig. 4 is a sectional, side view, of the oven assembly illustrating the oven as having a short baking receptacle disposed therein that is particularly adapted for making a short loaf, or a cake.

Fig. 4A is a side view, of the cam assembly, and of the related parts associated therewith.

Fig. 5 is a longitudinal, sectional, side view, of the assembled device. This view is taken on line 5—5 of Fig. 1, looking in the direction indicated.

Fig. 6 is a longitudinal, sectional, side view, of the mixing head, the dispensing valve and tube and illustrating in sectional side view the sifter and the lower discharge end of the holding and dispensing container and of the oven assembly. In this view the valve is shown open and in position for dispensing materials into the dispensing tube and into the mixing chamber.

Fig. 7 is a sectional, side view, of the mixing head illustrated in position within the baking container, and illustrating the mixing head in full lowered position.

Fig. 8 is a sectional, plan view, of the lower end of the mixing head. This view is taken on line 8—8 of Fig. 6, looking in the direction indicated.

Fig. 9 is an inverted, sectional, plan view, of the upper end of the mixing head. This view is taken on line 9—9 of Fig. 6, looking in the direction indicated.

Fig. 10 is a plan view, of the timing head and of the settable arms carried by the assembled timing head. In this view is also shown a diagrammatical layout of the electric circuits leading from the source of electric energy to the prime mover, to the timing head and to the heat elements.

Fig. 11 is a sectional, end view, of the settable timing arm and of the electric contact finger carried thereby and illustrating in fragmentary, sectional, side view the timing head. This view is taken on line 11—11 of Fig. 10, looking in the direction indicated.

Like reference characters refer to like parts throughout the several views.

I preferably form my device comprising the same of a base 1. A hub 2 upwardly extends from the base 1, in which a supporting spindle 3 is mounted. An open spider 4 is secured to the spindle and is journaled relative thereto to adapt the same for being rotated therearound. A plurality of arms 5 upwardly extend from the spider and an insulated oven 6 is superposed the spider and is secured thereto and is adapted to be rotated relative to the spindle as the spider is rotated.

An electric prime mover 7 is associated with a speed reducer 9, and the speed reducer is secured to and supported by the bracket 8. An electric collector ring 10 rests directly upon the hub 2 and electric contacts are formed with the collector ring through the application of a collector brush 11 that engages the upper contacting surface of the electric collector ring 10. Suitable conduits 12 lead from the brush holder 13 to sources of supply of electric energy.

Conductors 14 are disposed within the conduits and lead to heating elements 15 disposed within the oven 6. The oven 6 is insulated at its base and at its oppositely disposed sides by the placing of suitable insulating material between the spaced walls comprising the oven. A plurality of spaced individual baking pans are adapted for placement within the oven. A false bottom ring 17 is disposed within the oven and upon which the individual baking pans 18 are supported where elongated loaves are to be made.

The individual baking pans are sufficiently spaced apart to facilitate the circulation of the heat entirely around the side walls of the individual baking pans.

Where relatively short loaves are to be baked, as cakes, or other desired bakery products that are made relatively short, I provide pairs of spaced locator shelves 19 and 20 within the oven structure and secure the same to the inner side walls of the oven. These pairs of spaced locator shelves are placed in registry horizontal alignment with each other so that inwardly extending lugs of the pairs of spaced locator shelves are adapted for supporting individual baking pans 21 within the oven and for resting directly upon the upper surface of the pairs of shelves. A fixed plate 22 is secured to the spindle 3 and an insulator ring 23 extends around the top of the oven and acts as a cover plate for the assembly. To afford access to the oven, I provide at either side, cut outs 24 and 25, at suitable spaced intervals around the top of the cover plate 22.

Suitable removable covers 26 are provided for covering the openings. The cover plates are also insulated on their underside. A plurality of uniformly spaced material holders, here shown as four in number at 27, 28, 29 and 30, and a central material holder 31, are superposed the assembly and are directly and indirectly supported upon the spindle by a suitable spider 32 and a hub 33 that terminates the lower end of the central material holder 31. A filler tube 34 is indirectly supported upon a bracket 35, also secured to the spindle 3.

A power shaft 36 is driven by the prime mover 7 through the action of the speed reducer 9. The speed reducer has a dual power outlet and the power shaft 36 is adapted for being driven by the speed reducer at a relatively high speed. A suitable driving element, as a bevel gear 37, is secured to the upper end of the shaft 36. A driven shaft 38 is journaled within the bracket 35 and a bevel gear 39 coacts with the bevel gear 37 and is adapted for being driven thereby. A spline 40 is disposed in the outer surface of the tube 34. The entire mixing head assembly and filler tube are adapted for being raised and lowered into and out of registry with the material holders 27 to 30 inclusive and also for being raised and lowered into and out of the individual baking pans in order that the materials may be deposited and agitated as deposited within the individual baking pans and for later agitating and/or beating the materials during and after proofing and raising within the individual baking pans, as desired.

Referring to Figs. 6 and 7 inclusive a bevel pinion 41 is disposed upon the outer end of the shaft 38 and a bevel gear 42 coacts with the bevel pinion 41 and drives the same at all times when the shaft 38 is being driven. The filler tube is adapted for being moved longitudinally of the bevel gear 42 and for being rotated as the bevel gear 42 is rotated.

The filler tube may be moved along the spline 40. The uppper end of the tube is hopper like, as illustrated at 43, at its upper end, to adapt the same for being placed into and out of registry with the collars 44 terminating the discharge end of each of the containers 27 to 30 inclusive.

A sifter screen is disposed at the discharge outlet of each of the bakery material holders 27 to 30 inclusive. The sifter is comprised of a screen 46 and a spider agitator 47. An arm 48 upwardly extends from the spider to agitate the materials and to prevent arching of the same above the screen. This arm also aids in the aerating of the materials and insures a definite feed of the materials upon the screen.

An arm 49 downwardly extends from the sifter assembly and as the filler tube 34 is raised to maximum position a lug 50, disposed upon the inner surface of the hopper like end of the filler tube, engages the arm and rotates the entire spider assembly of the sifter head and causes the desired amount of material to be sifted from the container through the filler tube into the mixing chamber 51 disposed therebelow. The amount of material being deposited is entirely dependent upon the length of time that the sifter is rotated. It has been found for all practical purposes that this delivers a measured amount of material into the mixing chamber 51, due to the sifter being operated for a definite period of time.

A valve stem 52 is disposed longitudinally of the filler tube and the valve stem is supported upon a supporting cross bar 53. A reacting element, as a coil spring 54, is disposed about the valve stem and normally maintains the valve 55 seated relative to the discharge end 56 of the filler tube. The upper end of the valve stem is adapted for engaging the hub end 57 of the sifter spider and when the filler tube is fully raised the valve stem is made to engage the hub 57 and automatically unseats the valve 55 relative to the discharge end of the filler tube. The unseating of the valve permits sifted material flowing from the filler tube directly into the mixing chamber 51.

The central material holder 31 is primarily intended for supporting fluids and a tube 58 leads from the base of the liquid holder and deposits the fluid directly into the mixing chamber. A valve 59 is disposed within the tube and an automatic valve 60 is also disposed within the discharge tube.

An arm 61 outwardly extends from the automatic valve. The automatic valve is normally maintained closed by any suitable automatic closure spring associated within the valve. An opening pin 62 is secured to the bracket 63 and outwardly extends therefrom. The opening pin 62 is placed in registry alignment with the arm 61 and when the filler tube assembly is fully raised the opening pin 62 engages the underside of the arm 61 and opens the automatic valve during the full raised period of the filler tube, thus permitting the fluid to flow directly into the mixing chamber 51, while the filler tube is raised. The lowering of the filler tube assembly releases the opening pin 62 from the arm 61 thereby permitting the automatic valve 60 for being closed and thus stopping the flow of fluid through the valve into the mixing chamber 51.

Agitating fingers 64 downwardly extend from the filler tube and these fingers are rotated in the same direction of rotation as the filler tube is rotated.

The sleeve 65 is disposed upon the outside of the filler tube and a bevel gear 66 is secured to the sleeve. The bevel gear 66 coacts with the bevel pinion 41 and is driven thereby when the filler tube is in fully raised and in partially lowered position.

A reacting element, as a coil spring 67, rests upon its one end upon a hub 68 of the sleeve 65. The oppositely disposed end of the reacting element rests upon the underside of the bevel gear 69. Agitating fingers 70 downwardly extend from the head 71, of the mixing chamber 51. Immediately the filler tube is lowered the reacting element coil spring 54 seats the valve 55 relative to the lower end of the filler tube and the partial lowering of the filler tube permits the reacting element 67 to maintain the bevel gear 66 in driven engagement with the bevel pinion 41 and at all times when the gear 66 is in driven engagement with the pinion 41 the fingers 70 are driven in the opposite direction to that of the fingers 64 to thereby set up a violent agitation of the materials. The further lowering of the filler tube assembly and of the head 71 within the mixing chamber 51 forces the agitated material through an opening that has been created within the bottom of the mixing chamber. Suitable guideways 72 and 73 are parallelly disposed with each other and a gate 74 is adapted for being moved within the guideways and for opening the bottom of the mixing chamber. This opening occurs simultaneously with the final lowering of the head 71 within the mixing chamber.

An arm 75 is rockably supported about a journal pin 76 and a reacting element, as a coil spring 77, is secured upon its one end to an arm 75. Its opposite end is secured to any suitable shaft support, as a pin 78 that upwardly extends from the closure plate 22. The coil spring 77 normally maintains the gate 74 in full closed position.

A link 79 connects the gate 74 with the arm 80 75. The link is secured to the gate and the arm by any suitable connecting pins 80 and 81.

The lower ends of the sets of agitating fingers 64 and 70 pass through a supporting and cleaning bar 82 and as the agitating fingers are moved longitudinally relative to the cleaning and supporting bar all incrustations and deposits formed thereupon are automatically removed from the fingers.

Discharge openings 83 and 84 are disposed at the oppositely disposed sides of the bar 82 to permit the free escapement of the agitated material therepast when the mixing head assembly is fully lowered.

As heretofore stated two shafts deliver power from the speed reducer. The shaft 36 is driven at a relatively high speed and the shaft 85 is driven at a different rate of speed. Any suitable driving means as a sprocket 86 is disposed upon the shaft 85 and a sprocket 87 is disposed upon the shaft 88. Any suitable driving means as a driving chain 89 is trained about the respective sprockets 85 and 87. The shaft 88 is supported within the bracket 8. A multifaced cam 90 is carried by the shaft 88 and the multifaced cam is driven at the same rate of speed as the shaft 88 is driven. An arm 91 outwardly extends from the bracket 8 and a lifting arm 92 is journaled upon its one end relative to the arm 91 by any suitable journal pin 93. The cam roller 94 normally rides upon the rim 90A of the cam 90. The cam roller 94 is supported relative to the arm by any suitable journal support 94A. A raised cam surface 95 is disposed upon the cam 90 and as the cam roller 94 engages the raised camming surface 95 the lifting arm 92 is raised and the raising movement is multiplied and imparted to the link 96 that connects the lifting arm with the bracket 63. The movement of the bracket 63 raises and lowers the filler tube and mixing head assembly as heretofore described.

During the period that the cam roller 94 rides upon the raised cam 95 materials are being sifted and delivered into the mixing tube and into the mixing chamber and simultaneously therewith the fluid is flowing from the fluid holder 31 into the mixing chamber, and during the period that the cam roller 94 rides upon the cam surface 90A the delivered materials are simultaneously being agitated within the mixing chamber 51.

A depression camming surface 95A is disposed upon the cam 90 and during the period that the cam roller 94 is riding the depression 95A is the period of discharge of the material from the mixing chamber directly into the individual baking tin disposed therebelow.

It will thus be seen that I have delivered a batch of mixed agitated material in measured quantity automatically within the individual baking tin disposed therebelow.

An adjustable camming segment 97 rides directly upon the cam 90 and an arcuate slot 98 is disposed within the cam segment. A hand manipulative locking screw 99 is disposed within the arcuate slot and permits the precise placement of the camming segment relative to the cam 90. The cam roller 94 is made sufficiently long to ride the rim of the cam 90 and to also engage the cam segment 97, as desired.

The purpose and object of the cam segment 97 is to predetermine the length of the camming surface 95, since the top alignment of the segment 95 and the segment 97 is in uniform surface alignment. This cam segment provides hand adjustable means for predetermining the amount of time that the filler tube will be raised into engagement with the bottom of the container holding bakery filling materials and therefore automatically provides settable means for predetermining the amount of materials that are to be delivered into the mixing chamber and therefore predetermines the size and shape of resultant loaf that is to be made.

A star wheel 100 is secured to the spider 4 that supports the oven assembly. A pin 101 downwardly extends from the underside of the cam 90 and at each revolution of the cam 90 the pin 101 engages within one of the openings 102 of the star wheel and turns the star wheel for the space of one of the notches disposed within the star wheel and also rotates the oven for the space of one the individual baking tins disposed therein to automatically place the next succeeding individual baking tin below the filler tube and mixing chamber assembly.

The star wheel rotating pin 101 is so positioned upon the cam that the rotation of the oven assembly follows the delivery of the last batch into the individual baking tin.

This is preferably accomplished during the period in which the filler tube and agitating head assembly are in partially lowered position and after the filler tube has been disengaged from the discharge end 44.

To provide flexibility for my automatic baking machine, I have found it desirable to provide automatic means for the baking of any desired number of unit loaves of material. This is accomplished by the placing of a pin 104 upon the outer peripheral surface of the oven 6. This oven 6 has a plurality of spaced holes formed in its side wall into which the stop pin 104 may be placed. The placing of the stop pin predetermines the movement of units of material that are to be baked at each cycle of baking operation to be performed by my automatic baking machine.

A shaft 105 is disposed above the fixed plate 22 and the shaft 105 is journaled within any suitable journal supports 106 and 107. An arm 108 is carried by the shaft 105 and the same is positioned in registry alignment with the stop pin 104. An arm 109 is also carried by the shaft 105 and a link 110 is connected upon its one end with the arm 109 and is adapted for having longitudinal movement imparted to the link. As the arm 109 is manipulated the upper end of the link 110 is held in position by a bracket 111 and the link 110 is moved within an opening disposed within the bracket which maintains the upper end of the link in precise position.

A cam surface 112 is disposed in registry alignment with the upper end of the link and the engagement of the link with the camming surface rotates the spider assembly 32 out of registry with the upper end of the filler tube when the filler tube is partially lowered. A bell crank 113 is journaled about any suitable journal supporting pin 114 and a stop pin 115 is carried by the link 110. The engagement of the stop pin 115 with the bell crank 113 manipulates the valve stem 59 by having link 116 connect the bell crank with the arm 117 of the valve 59. This provides automatic means for predetermining the number of units of materials that are to be baked.

An arm 118 is also carried by the shaft 105 and a switch box 119 having an electric switch disposed therein is adapted for being thrown by the arm 118 when the arm 108 contacts with the stop pin 104. This switch breaks the electric circuit leading to the motor 7 and automatically stops the prime mover. The electric circuits leading from the switch to the prime mover is carried through the electric conduit 120.

A cam 121 outwardly extends from the master cam 90. A shaft 122 is journaled within the bracket 8 and within the fixed closure plate 22, and a camming pawl 123 is carried by the lower end of the shaft 122 and the cam pawl is adapted for being placed in registry alignment with the cam 121 and is adapted for being actuated by the cam 121 when the cam 90 is rotated to place the cam 121 in registry with the cam pawl 123. The engagement of the cam 121 with the cam pawl 123 occurs simultaneously with the lowering of the mixing head within the mixing chamber to full lowered position, at which time the gate 17 is actuated. A cam arm 124 is carried by the shaft 122 and the cam arm 124 is placed in registry engagement with the arm 75 and operates the same as hereinbefore described.

Referring to Figs. 10 and 11 inclusive I have illustrated the master time control unit devices that are to be used with my device for manually setting the automatic machine for performing its functions automatically and continuously in cycles of operations until the device is automatically, or manually stopped.

I provide a graduated plate 125 having unit graduations from 1 to 12 uniformly spaced upon its upper face and adjacent the outer periphery of the plate. A contactor arm 126 is carried by the time meter and the arm 126 runs continuously so long as the time meter is in operation. Electric terminal timing rings, here shown as two in number, at 127, and 128 are disposed upon the upper surface 125 of the face. The ring 127 controls and energizes the prime mover 7, and the ring 128 automatically controls and energizes the heat elements 15 with electric circuits leading to the prime mover and to the heat elements. The electric circuits are illustrated diagrammatically in Fig. 10.

A plurality of spaced holes 129 are disposed in the ring 127 and a plurality of spaced holes 130 are disposed within the ring 128. Settable electric terminal pins 131, as illustrated in detail in Fig. 11, are adapted for being placed within the respective holes 129 and 130. Contactor fingers, here shown as two in number 132 and 133 are carried by the contactor arm 126 and the contactor fingers 132 and 133 are adapted for registering with and completing the circuits when the same contact with the settable electric terminal pins 131. A wiping contact is provided between the contactor fingers 132 and 133 in order that the electric contact between the finger and the terminal pins may be maintained for slight intervals of time.

Where the heat elements are to be energized for a stated interval of time, the pins may be placed in groups, as illustrated at 134, so that the heat element disposed within the oven will be energized as long as the finger 132 is in contact with the continuous line of pins 124, as illustrated in Fig. 10.

A relay switch 119 is disposed within the circuit and when the contact finger 133 is in engagement with the contact pin 131 the relay switch is closed and the switch engages the terminals 135 and 136 and current will flow through the circuits to the prime mover. A locking lug 137 is carried by the relay switch 119 and a locking pawl 138 is disposed in registry alignment with the locking lug 137 and when the relay switch is automatically closed the same is maintained closed by the locking pawl engaging the locking lug. The pawl is rockably supported about a suitable support 139 and the same is normally maintained in registry alignment with the locking lug by any suitable reacting element as a coil spring 140. When this circuit is automatically broken through the action of the stop pin 104 actuating the shaft 105, it will automatically trip the locking pawl 136 by the arm 118 engaging the locking pawl 138.

When my automatic baking machine is to be used for the automatic baking of bread and where the bread is to be proofed within the baking tins for a specified period and then is to be agitated and thereafter reagitated a second time after proofing and before being baked I provide contact pins 141 within, or at the desired time for the proofing operation and also provide contact pins 142 at a sufficient time thereafter to agitate the batches after proofing and agitation before baking.

To meet the requirements of the individual kind of bread that is to be made, thereafter and in sufficient spaced time relationship the finger 132 contacts the contact pins 134, thereafter the relay 143 is actuated by the contact finger 132. This closes the relay switch 142A with the electric terminals 144 and 145 to thereby complete the electric circuit through the collector ring 110 and heat elements 15.

To start a cycle of baking operations, the cam 90 is placed in starting position by registering the cam face 95A with the cam roller 94. When the cam 90 is in this position the arm 92, link 96, bracket 63, filler tube 34, and the mixer head are lowered to the bottom of their travel as shown in Fig. 7. The kind of bread to be baked is next selected by manually rotating one of the flour holders 27, 28, 29 and 31 to a position directly above the filler tube hopper 43. The pin 104 is next positioned at a point on the periphery of the oven 6, predetermining the number of loaves to be baked.

Referring to Fig. 10 the contact points 141 are placed in positions for starting the motor 7 at predetermined intervals. The contactor arm 126 is shown in starting position and contacting the first contact pin 141.

The object of the numerals 1 to 12 is to divide the sepacing between the contact points into proper time intervals.

The contact points 134 are also placed in position for turning on the heating elements 15 for baking.

When the motor 7 is started and the cam wheel 90 is revolved in the direction of the arrow at a relatively slow speed the cam roller contacts the cam surface 95 thereby raising the arm 92 to the position shown in Fig. 6. Coincident with the foregoing cycle, the shaft 36 is revolved at a relatively high speed, rotating the filler tube. When the arm 92 is in full raised position the sifter screen is revolved and discharges flour into the mixing chamber 51 through the filler tube 34. Simultaneously therewith the valve 60 is held open, thus permitting the liquid to flow into the chamber 51. The pinion drives the filler tube 34 and fingers 61 in one direction, and the gear 66, top head 71, and fingers 70 in the opposite direction. This mixes the dough within the mixing chamber 51. The size of the loaves to be baked is determined by the amount of time the arm 92 is in full raised position. The cam surface 95 and cam surface 97 are on the same plane, and the position of the adjustable cam 97 will determine the amount of time that the arm 92 will be in full raised position.

When the cam roller 94 leaves the cam 97 it engages the cam surface 90A which is slightly lower, thus dropping the arm 92 and bracket 63 sufficiently for the filler hopper to clear the sifter and allowing the pin 62 to close the valve 60, thereby shutting off the supply entering the mixing chamber. The spring 67 still continues to hold the pinion 66 in driven engagement with the pinion 41. The dough mixing will continue until the cam 121 contacts the pawl 123, revolving shaft 122, engaging arm 124, with the arm 75 and rocking it about pin 76 to thereby open the gate 74. Simultaneously therewith the cam roller 94 drops into the cam surface 95A lowering the arm 92, bracket 63, filler tube 34 and mixing fingers 64 and 70 to discharging position shown in Fig. 7.

As the cam surface 95 comes into contact with the cam roller 94 the arm 92, bracket 63, and filler tube will be again raised to receiving position to begin another cycle of operation. The cam 121 allows the gate 74 to close after the predetermined number of baking pans have been filled with dough, the pin 104 engages the cam 108, rotates shaft 105, raises the link 110, engaging the cam surface 112 of the spider 32 rotating the spider sufficiently to offset the holder 27. The object of off-setting the holder 27 is to allow the mixer head to mix down the dough within the baking pans without receiving more material. The valve 59 is also closed when the link 110 is raised.

The rotating of shaft 105 rocks the arm 118 to disengage the solenoid 119 and thus breaks the motor circuit. The dough in the baking pans is now allowed to raise for a predetermined time. When the contact arm 126 contacts the second pin 141 the motor will again start and the mixing head repeats the heretofore described cycle of operation, except that no new material is introduced, the only object being to mix down the dough within the bread pans. When this cycle of operation is again completed the pin 104 will stop the motor. After the dough has been mixed down a sufficient number of times the motor is finally turned off by the pin 104. The contact arm 126 and contact finger 132 will contact the contact pin 131 thus closing the relay switch 142A and thereby turning on the heat elements 15 for baking the dough. The oven may be turned on during the last mixing down of the dough.

When the predetermined number of contacts 131 has been traversed by the arm 136 the oven will be turned off and the complete cycle of preparing the dough and baking the same will have been completed.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a base, an oven superposed the base, means for supplying heat to the oven, automatic means for supplying heat to the oven at predetermined times and for predetermined periods of time, removable baking pans disposed at spaced intervals within the oven, means disposed above the baking pan receptacles and adapted for forming a closure for the oven, means for automatically admitting materials into the pans one at a time for baking, means for automatically admitting a predetermined amount of materials into the baking pans and for agitating the admitted materials at predetermined time intervals and for predetermined intervals of time, and means for moving the agitator alternately from one pan to the other.

2. In a device of the class described, the combination of a base, an electric prime mover disposed upon the base, means for conducting electric energy to the prime mover, automatic means for energizing the prime mover at predetermined times and for predetermined time intervals, an insulated oven superposed the base, individual baking pans removably disposed within the oven, a top closure for the oven, closures disposed within the top adapted for admitting entry into each of the baking tins, means superposed the compartmented oven, for admitting materials into the baking pans, means for agitating the materials as admitted, and means for agitating the materials for a predetermined time within each of the compartments and at settable time intervals.

3. In a device of the class described, the combination of a base, an electric motor disposed upon the base, means for conducting electric energy to the prime mover, means for energizing the prime mover for predetermined periods of time, a thermal insulated oven superposed the base, individual baking pans disposed within the oven and spaced apart, electric means for heating the oven, means superposed the oven for holding bakery materials, means for admitting measured amounts of materials into the oven compartments, means for agitating the materials as admitted, and means for agitating the materials at spaced intervals of time and for predetermined periods of time.

4. In a device of the class described, the combination of a fabricated frame, an electric motor disposed within the frame, means for energizing the motor at spaced intervals of time and for predetermined periods of time, an oven disposed within the frame, individual removable baking compartments disposed within the oven, means for admitting measured amounts of bakery materials within predetermined ones of the baking compartments and for agitating the same as admitted and at predetermined time intervals and for predetermined intervals of time thereafter, and means for automatically energizing the oven heat elements for a predetermined time interval.

5. In a device of the class described, the combination of a fabricated frame, an oven disposed within the frame and adapted for being electrically heated automatically at predetermined time intervals, means for admitting baking materials within the oven and for agitating the same, as admitted, and means for agitating the admitted materials at predetermined time intervals and for predetermined periods of time.

6. In a device of the class described, the combination of a base, a spindle upwardly extending from the base, an electric motor disposed upon the base, an insulated compartmented oven rotatably mounted to the spindle, a plurality of holders disposed upon the spindle and spaced apart from the oven, a sifter disposed at the discharge outlet of the holders, a filler chute adapted for being power rotated and for being raised into registry engagement with the discharge outlet with the holder and for actuating the sifter when engaged with the holder, settable means for predetermining the time engagement between the filler chute and the holder, an agitator carried by the filler chute, a mixing chamber disposed between the filler chute and the compartments of the oven, means for agitating materials during and after delivery into the mixing chamber, means for discharging materials from the filler chute into the oven compartments, one at a time, means for agitating the materials delivered into the oven at predetermined time intervals and for predetermined intervals of time, and means for automatically energizing the heat elements of the ovens for predetermined intervals of time.

7. In a device of the class described, the combination of an insulated compartmented oven, means for electrically heating the oven, means for predetermining the interval and the time the heat element is to be energized, automatic means for admitting a mixed material into the oven compartments, one at a time, means for automatically agitating the material after delivery into the oven compartments and at predetermined periods and for predetermined periods, and means for stopping the cycle of operation automatically, at the completion of the baking cycle.

8. In a device of the class described, the combination of an insulated compartmented oven, removable spaced compartments disposed within the oven, automatic means for delivering a mixed aggregate within each of the compartments, one at a time, means for agitating the material delivered and after delivery into the compartments of the oven, means for electrically heating the oven, means for automatically turning the heat off at a set time interval within the oven, and means for predetermining the number of compartments of the oven that are to be filled and agitated.

9. In a device of the class described, the combination of an insulated compartmented oven, the compartments of the oven being arranged in a circle and uniformly spaced apart, automatic means for delivering by gravity mixed aggregates within the compartments of the oven, one at a time, means for automatically energizing a heat element disposed within the oven for a predetermined period and at a predetermined period.

10. In a device of the class described, the combination of an insulated oven having removable baking pans disposed within the oven and at uniformly spaced intervals, means for delivering measured amounts of mixed aggregates within each of the baking pans, means for agitating the aggregates disposed within each of the pans, one at a time, and means for automatically heating the oven at a predetermined period and for a predetermined period.

11. In a device of the class described, the combination of a spindle, a base adapted for supporting the spindle in a vertical position, an electric prime mover disposed upon the base, means for energizing the prime mover at predetermined time intervals and for definite time intervals, a compartmented baking oven disposed above the base, individual and removable baking tins disposed within the compartments of the oven, a plurality of holders superposed the oven, means for selectively admitting sifted materials in measured amounts from the selected ones of the holders, means for agitating the materials as admitted into the baking pans and after admittance into the baking pans, and means for opening the top of the oven to permit the removal of the baking pans from the oven.

12. In a device of the class described, the combination of an insulated compartmented oven having removable baking pans disposed within the compartments of the oven, means for applying heat to the oven at and for predetermined time intervals, means for admitting materials into the compartments of the oven and for agitating the materials as admitted and at predetermined time intervals after admittance, means for regulating the amount of materials admitted into each of the compartments as admitted, and means formed in the top of the oven to facilitate the removal of the baked units, one at a time.

13. In a device of the class described, the combination of an insulated compartmented oven adapted for being electrically heated at definite and for definite time intervals, means for admitting definite amounts of materials into each of the compartments and for agitating the materials at the time of admittance and thereafter for definite time intervals and automatic means for heating the oven at and for definite time intervals.

14. In a device of the class described, the combination of an insulated compartmented oven that is adapted for being electrically heated for and at definite time periods, means adapted for depositing aerated and mixed materials into the oven compartments one at a time, a plurality of holders superposed the compartmented oven, means for selectively directing their contents into the compartments of the oven and settable means for predetermining the number of the oven compartments that are to be utilized at each baking cycle.

15. In a device of the class described, the combination of an insulated compartmented oven circular in plan, that is adapted for being electrically heated at definite and for definite time intervals, a plurality of holders superposed the oven and means for dispensing materials therefrom into the oven compartments and for sifting and agitating the materials as dispensed, and settable means for a predetermining the number of compartments of the oven that are to be filled at each baking cycle.

16. In a device of the class described, the combination of an insulated compartmented electrically heated oven that is circular in plan, and rotatably mounted means for placing a sifted and agitated mixture into each of the compartments and settable means for predetermining the number of compartments that are to be filled during each rotation of the oven.

17. In apparatus of the class described, the combination of a plurality of rotatably mounted and settable reservoirs, means below said reservoirs for receiving and distributing selected amounts of the contents of two of said reservoirs into a mixing chamber, and a plurality of receptacles disposed below said distributing means for receiving said selected amounts from said reservoirs, and means for baking said selected amounts.

CHARLES G. HALL.